(12) United States Patent
Ooi et al.

(10) Patent No.: US 11,710,029 B2
(45) Date of Patent: Jul. 25, 2023

(54) METHODS AND APPARATUS TO IMPROVE DATA TRAINING OF A MACHINE LEARNING MODEL USING A FIELD PROGRAMMABLE GATE ARRAY

(71) Applicant: Intel Corporation, Santa Clara, CA (US)

(72) Inventors: Kooi Chi Ooi, Bukit Gambir (MY); Min Suet Lim, Gelugor (MY); Denica Larsen, Portland, OR (US); Lady Nataly Pinilla Pico, El Dorado Hills, CA (US); Divya Vijayaraghavan, Los Altos, CA (US)

(73) Assignee: INTEL CORPORATION, Santa Clara, CA (US)

( * ) Notice: Subject to any disclaimer, the term of this patent is extended or adjusted under 35 U.S.C. 154(b) by 1281 days.

(21) Appl. No.: 16/147,037

(22) Filed: Sep. 28, 2018

(65) Prior Publication Data
US 2019/0050715 A1    Feb. 14, 2019

(51) Int. Cl.
*G06N 3/045* (2023.01)
*G06N 3/08* (2023.01)
(Continued)

(52) U.S. Cl.
CPC .............. *G06N 3/063* (2013.01); *G06F 1/163* (2013.01); *G06F 15/7892* (2013.01);
(Continued)

(58) Field of Classification Search
CPC ........ G06N 3/063; G06N 3/08; G06N 3/0454; G06N 3/084; G06N 3/0445; G06N 20/00;
(Continued)

(56) References Cited

U.S. PATENT DOCUMENTS 6,594,824 B1 * 7/2003 Volkonsky .............. G06F 8/445
707/999.005
2008/0262984 A1 * 10/2008 Xu ........................ G06F 16/334
706/12

(Continued)

OTHER PUBLICATIONS

Zhao et al., Towards Efficient Convolutional Neural Network for Domain-Specific Applications on FPGA (Sep. 4, 2018) (Year: 2018).*

(Continued)

*Primary Examiner* — Luis A Sitiriche
(74) *Attorney, Agent, or Firm* — Hanley, Flight & Zimmerman, LLC

(57) ABSTRACT

Methods, apparatus, systems, and articles of manufacture are disclosed to improve data training of a machine learning model using a field-programmable gate array (FPGA). An example system includes one or more computation modules, each of the one or more computation modules associated with a corresponding user, the one or more computation modules training first neural networks using data associated with the corresponding users, and FPGA to obtain a first set of parameters from each of the one or more computation modules, the first set of parameters associated with the first neural networks, configure a second neural network based on the first set of parameters, execute the second neural network to generate a second set of parameters, and transmit the second set of parameters to the first neural networks to update the first neural networks.

23 Claims, 9 Drawing Sheets

(51) Int. Cl.
| | |
|---|---|
| *G06N 5/04* | (2023.01) |
| *G06N 3/063* | (2023.01) |
| *G06F 15/78* | (2006.01) |
| *G06F 1/16* | (2006.01) |
| *G06N 20/00* | (2019.01) |
| *G06F 16/00* | (2019.01) |
| *G06N 3/084* | (2023.01) |
| *G06V 10/94* | (2022.01) |
| *G06F 18/214* | (2023.01) |
| *G06F 18/21* | (2023.01) |
| *G06F 18/2413* | (2023.01) |
| *G06N 3/048* | (2023.01) |
| *G06V 10/764* | (2022.01) |
| *G06V 10/774* | (2022.01) |
| *G06V 10/776* | (2022.01) |
| *G06V 10/82* | (2022.01) |

(52) U.S. Cl.
CPC ............ *G06F 16/00* (2019.01); *G06F 18/214* (2023.01); *G06F 18/217* (2023.01); *G06F 18/24143* (2023.01); *G06N 3/045* (2023.01); *G06N 3/048* (2023.01); *G06N 3/08* (2013.01); *G06N 3/084* (2013.01); *G06N 5/04* (2013.01); *G06N 20/00* (2019.01); *G06V 10/764* (2022.01); *G06V 10/774* (2022.01); *G06V 10/776* (2022.01); *G06V 10/82* (2022.01); *G06V 10/955* (2022.01)

(58) Field of Classification Search
CPC ........ G06N 3/04; G06N 3/0481; G06N 5/003; G06N 3/0472; G06N 20/10; G06N 7/005; G06N 5/04; G06N 3/02; G06N 20/20; G06N 3/049; G06N 3/082; G06N 3/0436; G06N 3/10; G06N 3/088; G06N 3/0635; G06N 5/022; G06N 3/105; G06N 5/02; G06N 5/025; G06N 5/046; G06N 3/006; G06N 3/0427; G06N 5/045; G06N 7/00; G06N 3/06; G06N 3/126; G06N 5/043; G06N 3/00; G06N 5/00; G06N 99/00
See application file for complete search history.

(56) References Cited

U.S. PATENT DOCUMENTS

| | | | |
|---|---|---|---|
| 2015/0135176 A1* | 5/2015 | Kruglick | G06F 9/45533 |
| | | | 709/224 |
| 2017/0024641 A1* | 1/2017 | Wierzynski | G06K 9/4628 |
| 2019/0051290 A1* | 2/2019 | Li | G06N 3/084 |
| 2019/0258953 A1* | 8/2019 | Lang | G06N 5/003 |

OTHER PUBLICATIONS

Chaplot et al., Personalized Adaptive Learning using Neural Networks (Apr. 2016) (Year: 2016).*
Abdelfattah et al., DLA: Compiler and FPGA Overlay for Neural Network Inference Acceleration (Jul. 13, 2018) (Year: 2018).*
Y. Ma, Y. Cao, S. Vrudhula and J. -s. Seo, "An automatic RTL compiler for high-throughput FPGA implementation of diverse deep convolutional neural networks," 2017 27th International Conference on Field Programmable Logic and Applications (FPL), 2017, pp. 1-8, doi: 10.23919/FPL.2017.8056824 (Year: 2017).*
Dey S., Shao Y., Chugg K.M., Beerel P.A. (Oct. 24, 2017) Accelerating Training of Deep Neural Networks via Sparse Edge Processing. In: Lintas A., Rovetta S., Verschure P., Villa A. (eds) Artificial Neural Networks and Machine Learning—ICANN 2017. ICANN 2017. (Year: 2017).*

* cited by examiner

METHODS AND APPARATUS TO IMPROVE DATA TRAINING OF A MACHINE LEARNING MODEL USING A FIELD PROGRAMMABLE GATE ARRAY

FIELD OF THE DISCLOSURE

This disclosure relates generally to machine learning and, more particularly, to methods and apparatus to improve data training of a machine learning model using a field programmable gate array (FPGA).

BACKGROUND

Machine learning models, such as neural networks, are useful tools that have demonstrated their value solving complex problems regarding pattern recognition, natural language processing, automatic speech recognition, etc. Neural networks operate, for example, using artificial neurons arranged into layers that process data from an input layer to an output layer, applying weighting values to the data during the processing of the data. Such weighting values are determined during a training process. Training a machine learning model on a large dataset is a challenging and expensive task that can take anywhere from hours to weeks to complete.

BRIEF DESCRIPTION OF THE DRAWINGS

The figures are not to scale. In general, the same reference numbers will be used throughout the drawing(s) and accompanying written description to refer to the same or like parts.

DETAILED DESCRIPTION

Machine learning workloads, such as training a machine learning model on a large dataset, are challenging and computationally expensive tasks that can take anywhere from hours to weeks to complete. For example, obtaining large volumes of data to train a machine learning model used to generate personalized learning strategies that are optimized for special needs students can take years to complete. In such examples, data collection for individual student behavior may take years to ensure that the machine learning model produces conclusive results. In some instances, the unavailability of large volumes of labeled data to train the machine learning model causes a real-time correction gap when adjusting the machine learning model over time.

Certain machine learning workloads are better suited for particular types of hardware. Such hardware is referred to as a machine learning accelerator and may include, for example, an application specific integrated circuit(s) (ASIC(s)), a central processing unit (CPU), a field programmable gate array (FPGA), a graphics processing unit (GPU), etc., and/or combinations thereof. Example approaches disclosed herein accelerate dynamic data training for artificial intelligence tasks (e.g., personalized learning, adjusting logistic schedules of public transportation, medication dosage analysis, etc.) by utilizing one or more machine learning accelerators to dynamically train machine learning model(s) used for execution of a workload.

Examples disclosed herein include a usage model including one or more personalized computation modules that are coupled and/or otherwise paired with a machine learning accelerator (e.g., an ASIC, a FPGA, etc.). In some disclosed examples, the computation modules execute personalized machine learning models that obtain data in various formats tailored to users of the computation modules. In some disclosed examples, the computation modules generate outputs such as proposed customized learning strategies for special needs students, proposed medication dosage changes for hospital patients, etc. In some disclosed examples, the computation modules transmit obtained data, machine learning model parameters, etc., to the machine learning accelerator to accelerate training of the machine learning models of the computation modules. In some disclosed examples, the FPGA provides enhanced real-time data training, data inference, and error correction processes to generate updated machine learning parameters to be used by the computation models for improved operation.

Figure 1:
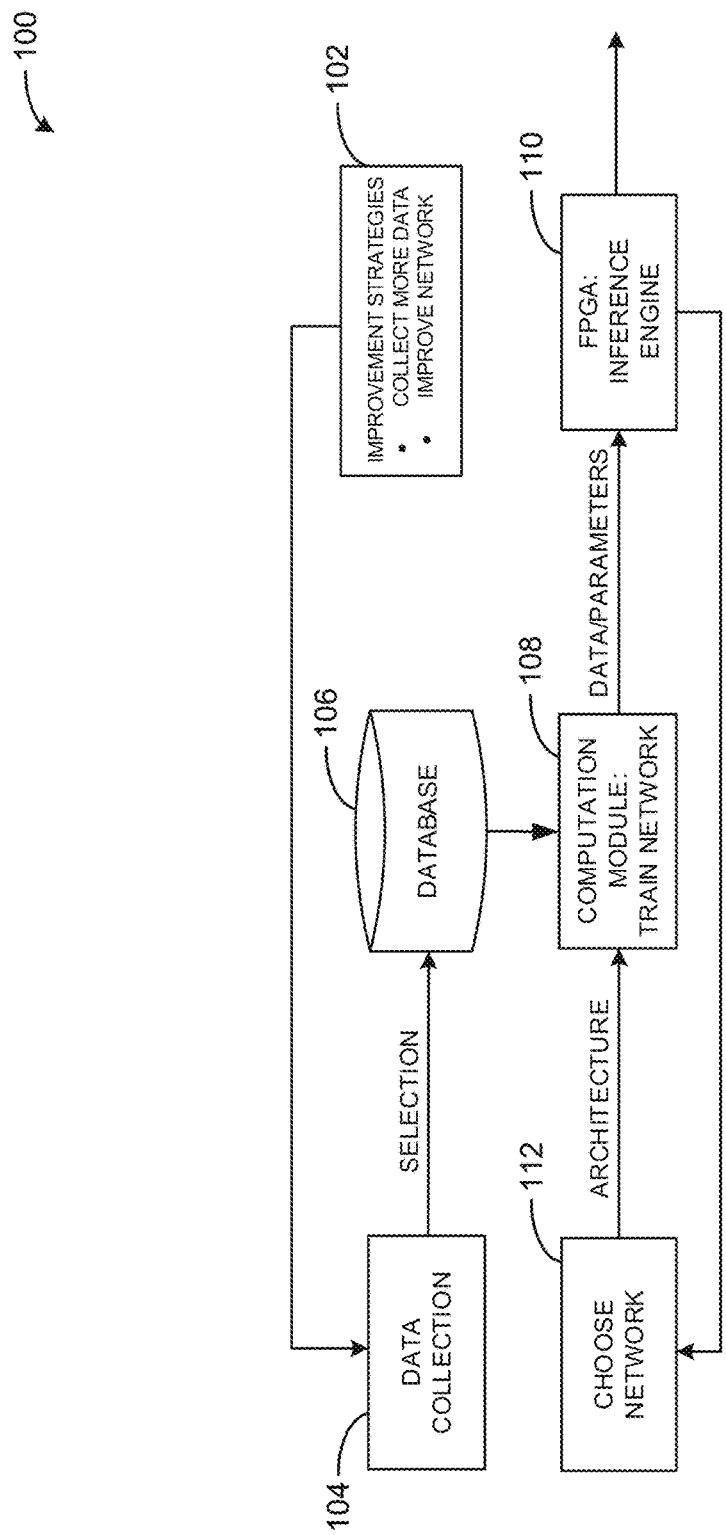
FIG. 1 is a block diagram of a typical machine learning system used to train a machine learning model such as a neural network.

FIG. 1 is a block diagram of a typical machine learning system 100 used to train a machine learning model such as a neural network. The machine learning system 100 implements a design flow with machine learning including a first operation 102. At the first operation 102, improvement strategies are generated and/or otherwise assembled. In the example of developing customized learning strategies for special needs students, the improvement strategies may correspond to previously determined learning strategies for a particular special needs student. The previously determined learning strategies may include audio, visual, or text-based techniques tailored for an individual special needs student's education as determined by a doctor, a parent, a teacher, etc.

In FIG. 1, data is collected at a second operation 104. For example, the data may include the improvement strategies that are generated at the first operation 102. In other examples, the data may include data that is collected using a camera (e.g., a video camera), a microphone, etc. Data may include audio of a student's speech when processing educational materials, video of the student's behavior when presented with the educational materials, etc. In response to collecting data to train the neural network at the second operation 104, a subset or an entirety of the collected data is selected to be stored in a database 106.

At the second operation 104, training the computation module may take weeks, months, etc. For example, data collected at the second operation 104 may include extensive manual effort by teachers, parents, doctors, etc., associated with a special needs student. In such examples, the manual effort includes classifying data based on generic grading rubrics, analyzing answers and responses from the special needs student, tutoring feedback, etc. Similarly, sourcing of data to train the computation module at a third operation 108 may take weeks, months, etc., because the data source is associated with only one special needs student.

When the collected data is stored in the database 106, a computation module trains a first neural network at the third operation 108. The first neural network may be based on a machine learning framework such as Caffe, SqueezeNet, ResNet, TensorFlow, etc. For example, the first neural network may be a Caffe based neural network. The computation module at the third operation 108 may train the first neural network using the improvement strategies assembled at the first operation 102, the data collected at the second operation 104, etc.

In FIG. 1, an FPGA obtains data and parameters at a fourth operation 110 when the personal computation module is trained at the third operation 108. For example, the FPGA may obtain data collected at the second operation 104 from the computation module. In other examples, the FPGA may obtain parameters (e.g., neural network parameters) associated with the first neural network from the computation module. At the fourth operation 110, the FPGA performs real-time inferencing by implementing a second neural network configured using the data, the parameters, etc., obtained from the computation module. When the FPGA detects an error using the obtained data, parameters, etc., the FPGA determines updated parameters for the first neural network that reduce and/or otherwise eliminate the error.

At a fifth operation 112, the computation module or a computing system (e.g., a server) communicatively coupled to the computation module chooses a network to be implemented by the computation module. At the fifth operation 112, a machine learning framework such as Caffe, SqueezeNet, ResNet, TensorFlow, etc., is selected based on the computation module. For example, the updated parameters generated by the FPGA at the fourth operation 110 may be mapped and/or otherwise translated to the first neural network in a format associated with Caffe. In response to the mapping at the fifth operation 112, the computation module updates the first neural network at the third operation 108 to generate outputs based on the updated parameters.

Figure 2:
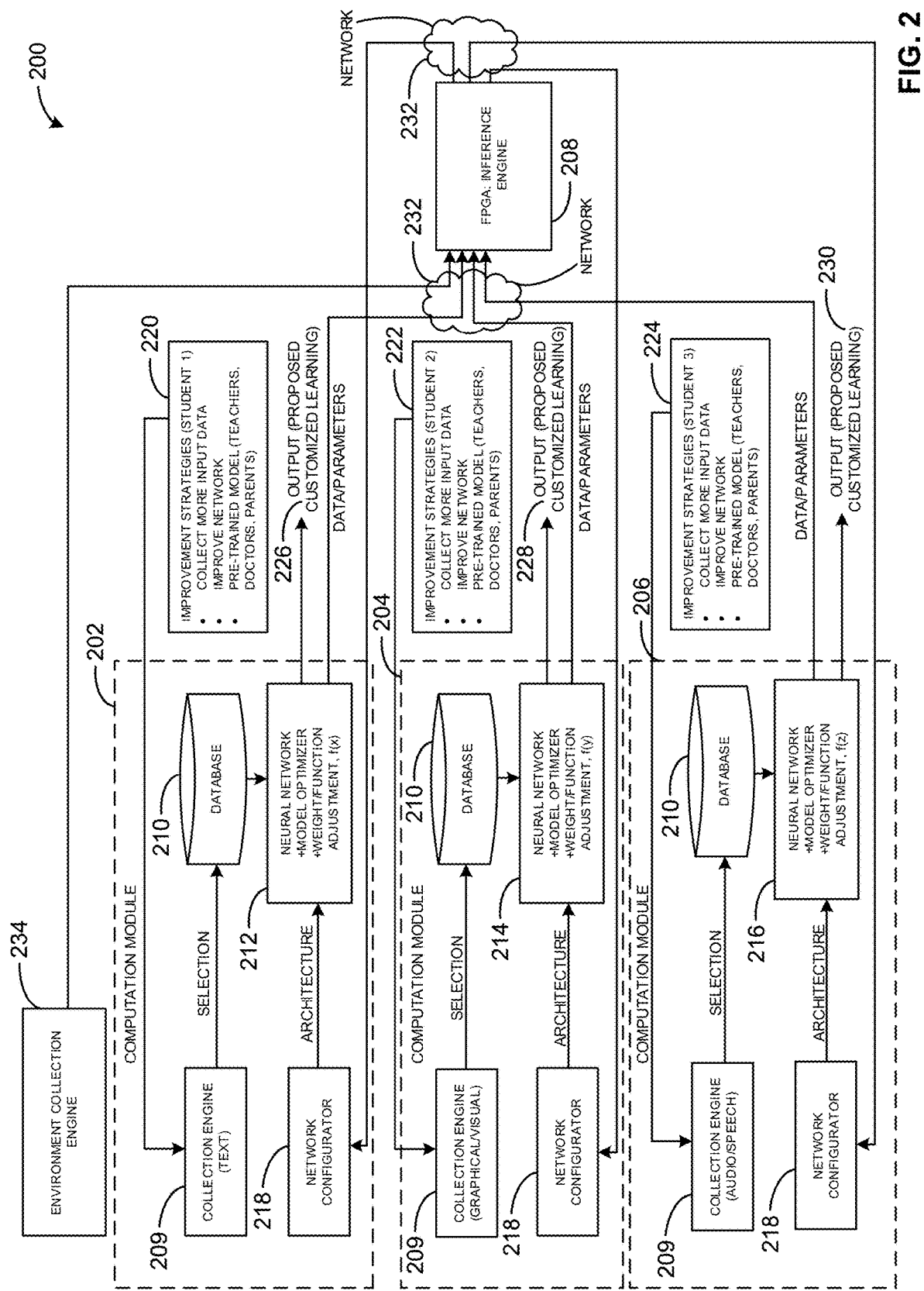
FIG. 2 is a block diagram of an example machine learning system including example computation modules and an example FPGA for accelerating training of neural networks executed by the computation modules.

FIG. 2 is a block diagram of an example machine learning system 200 including example computation modules 202, 204, 206 and an example FPGA 208 for accelerating training of neural networks executed by the computation modules 202, 204, 206. Although three computation modules 202, 204, 206 are depicted in FIG. 2, fewer or more than three computation modules 202, 204, 206 may be used. Although only the FPGA 208 is depicted in FIG. 2, more than one FPGA 208 may be used.

In the illustrated example of FIG. 2, the machine learning system 200 is deployed in a school environment. For example, the machine learning system 200 may be used to generate customized learning outputs used to prepare education lesson plans for special needs students. Alternatively, the machine learning system 200 may be applicable to any other environment using a machine learning model, application, etc. For example, the machine learning system 200 may be used to adjust medication dosages for hospital patients, modify logistic schedules for public transit systems such as bus systems, train systems, etc.

In FIG. 2, the computation modules 202, 204, 206 are computing systems such as a personal computer, a mobile device (e.g., a cell phone, a smart phone, a tablet such as an iPad™), a headset, or other wearable device, or any other type of computing device. Each of the computation modules 202, 204, 206 may be operated by a user (e.g., a student). In FIG. 2, the computation modules 202, 204, 206 include a first example computation module 202, a second example computation module 204, and a third example computation module 206. For example, the first computation module 202 may be a tablet (e.g., a tablet with a stylus) used to capture text or written data (e.g., handwritten data, mark-ups, notes, etc.) from a first student. In other examples, the second computation module 204 may be a laptop with an integrated camera used to capture graphical/visual data from a second student. In yet other examples, the third computation module 206 may be a smartwatch with an integrated microphone used to capture audio/speech from a third student. Alternatively, one or more of the students may have more than one computation module 202, 204, 206.

In the illustrated example of FIG. 2, the computation modules 202, 204, 206 each include an example collection engine 209, an example database 210, an example neural network 212, 214, 216, and an example network configurator 218. The computation modules 202, 204, 206 include the collection engine 209 to collect and/or otherwise obtain data that can be used to train the neural networks 212, 214, 216. The collection engine 209 includes means to obtain data from an input device of the computation modules 202, 204, 206. For example, the collection engine 209 may obtain data from one or more input devices such as an audio sensor, a microphone, a camera (still or video), a keyboard, a button, a mouse, a touchscreen, a track-pad, a trackball, an isopoint device, and/or a voice recognition system.

In the illustrated example of FIG. 2, the collection engine 209 obtains example improvement strategies 220, 222, 224 including first example improvement strategies 220 associated with the first student, second example improvement strategies 222 associated with the second student, and third example improvement strategies 224 associated with the third student. The improvement strategies 220, 222 224 each include a pre-trained machine learning model configured and/or otherwise developed based on input from a doctor, a parent, a teacher, etc., associated with the students. For example, the pre-trained machine learning models may be neural network models with parameters determined by a medical diagnosis, behavioral tendencies, etc. In such examples, the pre-trained machine learning models may correspond to a pre-defined neural network including a baseline number of layers, neurons per layer, training iterations, etc. In FIG. 2, the collection engine 209 stores the pre-trained machine learning models associated with the improvement strategies 220, 222, 224 in the database 210.

In the illustrated example of FIG. 2, the computation modules 202, 204, 206 include the database 210 to record data (e.g., audio data, text data, visual data, neural network model(s), neural network parameters, etc.). The database 210 can be implemented by a volatile memory (e.g., a Synchronous Dynamic Random Access Memory (SDRAM), Dynamic Random Access Memory (DRAM), RAMBUS Dynamic Random Access Memory (RDRAM), etc.) and/or a non-volatile memory (e.g., flash memory). The database 210 can additionally or alternatively be implemented by one or more double data rate (DDR) memories, such as DDR, DDR2, DDR3, mobile DDR (mDDR), etc. The database 210 can additionally or alternatively be implemented by one or more mass storage devices such as hard disk drive(s), compact disk drive(s) digital versatile disk drive(s), etc. While in the illustrated example the database 210 is illustrated as a single database, the database 210 can be implemented by any number and/or type(s) of databases. Furthermore, the data stored in the database 210 can be in any data format such as, for example, binary data, comma delimited data, tab delimited data, structured query language (SQL) structures, etc. In some examples, the database 210 can be cloud-based to enable synchronous retrieving and updating.

The computation modules 202, 204, 206 of FIG. 2 include the neural networks 212, 214, 216 to generate example outputs 226, 228, 230 including first example outputs 226, second example outputs 228, and third example outputs 230. In FIG. 2, the outputs 226, 228, 230 can correspond to proposed customized learning strategies for special needs students. For example, the first outputs 226 may include a learning strategy corresponding to a teaching lesson plan that incorporates an increased quantity of visual aids, visual aids with a particular color scheme, visual aids with a particular layout or organization, etc., where the learning strategy is customized, personalized, tailored, etc., for the first student.

The neural networks 212, 214, 216 of FIG. 2 include a first example neural network 212, a second example neural network 214, and a third example neural network 216. The neural networks 212, 214, 216 are personalized neural networks tailored and/or otherwise associated with a corresponding student. For example, the first neural network 212 is associated with the first student, the second neural network 214 is associated with the second student, and the third neural network 216. For example, the first neural network 212 is trained based on the first improvement strategies 220 and data collected by the collection engine 209 from one or more input devices of the first computation module 202.

Artificial neural networks such as the neural networks 212, 214, 216 are computer system architecture models that learn to do tasks and/or provide responses based on evaluation or "learning" from examples having known inputs and known outputs. Neural networks such as the neural networks 212, 214, 216 feature a series of interconnected nodes referred to as "neurons" or nodes. Input nodes are activated from an outside source/stimulus, such as input from the database 210. The input nodes activate other internal network nodes according to connections between nodes (e.g., governed by machine parameters, prior relationships, etc.). The connections are dynamic and can change based on feedback, training, etc. By changing the connections, the outputs 226, 228, 230 of the neural networks 212, 214, 216 can be improved or optimized to produce more/most accurate results. For example, the neural networks 212, 214, 216 can be trained using information from one or more sources to map inputs to the outputs 226, 228, 230.

Machine learning techniques, whether neural networks, deep learning networks, support vector machines, and/or other experiential/observational learning system(s), can be used to generate optimal results, locate an object in an image, understand speech and convert speech into text, and improve the relevance of search engine results, for example. Deep learning is a subset of machine learning that uses a set of algorithms to model high-level abstractions in data using a deep graph with multiple processing layers including linear and non-linear transformations. While many machine learning systems are seeded with initial features and/or network weights to be modified through learning and updating of the machine learning network, a deep learning network trains itself to identify "good" features for analysis. Using a multilayered architecture, machines (e.g., the computation modules 202, 204, 206) employing deep learning techniques can process raw data better than machines using conventional machine learning techniques. Examining data for groups of highly correlated values or distinctive themes is facilitated using different layers of evaluation or abstraction.

In some examples, the neural networks 212, 214, 216 are the same type of neural network. In other examples, one or more of the neural networks 212, 214, 216 may be different. For example, the first and second neural networks 212, 214 may be Caffe-based neural networks while the third neural network 216 may be a TensorFlow based neural network. In FIG. 2, the neural networks 212, 214, 216 are convolutional neural networks (CNNs). For example, the neural networks 212, 214, 216 may segment data using convolutional filters to locate and identify learned, observable features in the data. Each filter or layer of the CNN architecture transforms the input data to increase the selectivity and invariance of the data. This abstraction of the data allows the machine to focus on the features in the data it is attempting to classify and ignore irrelevant background information.

Deep learning operates on the understanding that many datasets include high-level features which include low-level features. While examining an image, for example, rather than looking for an object, it is more efficient to look for edges that form motifs that form parts, which form the object being sought. These hierarchies of features can be found in many different forms of data. Learned observable features include objects and quantifiable regularities learned by the computation modules 202, 204, 206 during supervised learning. As the computation modules 202, 204, 206 are provided with a large set of well classified data, the computation modules 202, 204, 206 become better equipped to distinguish and extract the features pertinent to successful classification of new data.

The computation modules 202, 204, 206 of FIG. 2 can properly connect data features to certain classifications as affirmed by the FPGA 208. Conversely, the computation modules 202, 204, 206 can, when informed of an incorrect classification by the FPGA 208, update the parameters for classification. Settings and/or other configuration information, for example, can be guided by learned use of settings and/or other configuration information and, as a system is used more (e.g., repeatedly and/or by multiple users), a number of variations and/or other possibilities for settings and/or other configuration information can be reduced for a given situation.

The neural networks 212, 214, 216 are initially configured by one or more pre-defined machine learning models included in the improvement strategies 220, 222, 224. For example, the first neural network 212 may be initially configured using a pre-defined machine learning model included in the first improvement strategies 220. In such examples, the pre-defined machine learning model of the first neural network 212 may be subsequently trained on a set of expert classified data from the database 210. This set of data builds the first parameters for the first neural network 212, and this would be the stage of supervised learning. During the stage of supervised learning, the first neural network 212 can be tested whether the desired behavior has been achieved.

In some examples, the neural networks 212, 214, 216 calculate a loss function to measure an inconsistency or a difference between a predicted value of the neural networks 212, 214, 216 and an actual value assigned to data stored in the corresponding database 210. For example, the first neural network 212 may obtain data from the database 210 such as a handwritten sample from the first student. The handwritten sample may have a first classification that has been verified and/or otherwise validated by a doctor, a teacher, etc., associated with the first student. The first neural network 212 may classify the handwritten sample with a second classification. The first neural network 212 may calculate a loss function based on a comparison of the first and second classifications. For example, the first neural network 212 may calculate the loss function by calculating a difference between an actual value associated with the first classification and a predicted value associated with the second classification.

In some examples, the neural networks 212, 214, 216 determine whether a loss function threshold has been satisfied. For example, the first neural network 212 may determine whether the loss function associated with the first and second classifications satisfies the loss function threshold. The first neural network 212 may compare the difference between the actual and predicted values to a loss function threshold value. The first neural network 212 may determine that the difference satisfies the loss function threshold value when the difference is greater than the loss function threshold value.

In some examples, the neural networks 212, 214, 216 determine parameter adjustments to reduce the loss function. For example, the first neural network 212 may determine to adjust a network topology, artificial neuron weights, bias values, a quantity of activation layers, etc., of the first neural network 212 when the loss function threshold has been satisfied. For example, the first neural network 212 may continuously update and train the first neural network 212 until the loss function has been minimized and/or cannot be reduced further. In such examples, the first neural network 212 may obtain and process (e.g., iteratively obtain and process) data from the database 210 to train the first neural network 212.

Once a desired neural network behavior has been achieved (e.g., the computation modules 202, 204, 206 have been trained to operate according to a specified threshold or accuracy threshold, etc.), the neural networks 212, 214, 216 of the computation modules 202, 204, 206 can be deployed for operation (e.g., testing the neural networks 212, 214, 216 with "real" data, new data, query data, etc.). During operation, neural network classifications can be confirmed or denied by the FPGA 208 to continue to improve and/or accelerate the training of neural network behavior. The neural networks 212, 214, 216 are then in a state of transfer learning, as parameters for classification that determine neural network behavior are updated based on ongoing interactions, where the updated parameters are determined by the FPGA 208.

In the illustrated example of FIG. 2, the machine learning system 200 includes the FPGA 208 to accelerate and/or otherwise improve training of the neural networks 212, 214, 216 of the computation modules 202, 204, 206. The FPGA 208 includes one or more machine learning models that can be adapted, modified, and/or otherwise configured based on data, parameters, etc., obtained from the computation modules 202, 204, 206 via an example network 232. For example, the FPGA 208 may include a neural network that synthesizes data, parameters, etc., obtained from one or more of the computation modules 202, 204, 206. In other examples, the FPGA 208 may include a neural network that corresponds to each of the computation modules 202, 204, 206. For example, the FPGA 208 may include a first FPGA neural network that uses data, parameters, etc., from the first neural network 212, a second FPGA neural network that uses data, parameters, etc., from the second neural network 214, a third FPGA neural network that uses data, parameters, etc., from the third neural network 216, etc.

In FIG. 2, the FPGA 208 is initially loaded with a pre-trained machine learning model such as an inference engine. For example, the FPGA 208 may obtain data from the computation modules 202, 204, 206 and determine whether a classification error is generated by processing the obtained data with the inference engine. In such examples, the FPGA 208 may generate new parameters that can be used to update one or more of the computation modules 202, 204, 206 to reduce and/or otherwise eliminate the classification error.

The FPGA 208 is re-programmed in response to obtaining data, parameters, etc., from one or more of the computation modules 202, 204, 206. For example, the FPGA 208 may obtain parameters of the first neural network 212. For example, the parameters may include a trained network topology, weights, bias values, etc., of the first neural network 212. The FPGA 208 may run a model optimizer to generate an optimized Intermediate Representation (IR) of the first neural network 212 based on the parameters. For example, an IR can correspond to a data structure or code used by the FPGA 208 to represent source code. In such examples, the IR can correspond to a representation of a program between a source language (e.g., a programming language associated with the first neural network 212) and a target language (e.g., a programming language associated with the FPGA 208), where the program may be independent of the source language and the target language. The FPGA 208 may be re-programmed to implement a neural network to test the IR of the first neural network 212. For example, the FPGA 208 may use the inference engine to test the first neural network 212 in the IR format with data (e.g., text, an image, etc.) obtained from the first computation module 202. In such examples, the FPGA 208 may detect classification errors when processing the data.

In some examples, the model optimizer of the FPGA 208 performs static, compilation-time analysis of the neural networks 212, 214, 216 to optimize execution on the computation modules 202, 204, 206. In some examples, the model optimizer included in the FPGA 208 performs horizontal and vertical layer fusion and redundant network branch pruning. In some examples, the model optimizer performs the fusion and pruning before quantizing the network weights of the neural networks 212, 214, 216. In some examples, the model optimizer feeds the reduced, quantized network to the inference engine, which further optimizes inference for the FPGA 208 with an emphasis on footprint reduction (e.g., a reduction in resources of the FPGA 208 used to test the neural networks 212, 214, 216).

In some examples, the FPGA 208 generates updated parameters, configurations, etc., of the neural networks 212, 214, 216 when a classification error is detected. For example, when detecting a classification error based on the first neural network 212, the FPGA 208 may generate a network topology, a weight, a bias value, etc., that can be deployed to the first computation module 202 to update the first neural network 212.

In some examples, the FPGA 208 is re-programmed when the FPGA 208 obtains data, parameters, etc., from all of the computation modules 202, 204, 206. For example, the FPGA 208 may generate an IR corresponding to a synthesis or combination of the neural networks 212, 214, 216. In such examples, the FPGA 208 may re-program itself to test the IR and determine whether classification errors are generated when using data from the first computation module 202, the second computation module 204, the third computation module 206, etc.

In some examples, the FPGA 208 is re-programmed between different tests of the neural networks 212, 214, 216. For example, the FPGA 208 may generate a first IR based on the first neural network 212, re-program itself using a first configuration to test the first IR, and generate first updated parameters for the first neural network 212 to use when updating. In response to generating the first updated parameters, the FPGA 208 may generate a second IR based on the second neural network 212, re-program itself using a second configuration different from the first configuration to test the second IR, and generate second updated parameters for the second neural network 214, where the second updated parameters are different from the first updated parameters.

In some examples, the FPGA 208 filters data (e.g., uncleaned data) obtained by the computation modules 202, 204, 206. For example, the FPGA 208 may test an IR generated based on parameters obtained from the first computation module 202 by using data collected by the collection engine 209 of the first computation module 202. For example, the FPGA 208 may obtain an image from the database 210 of the first computation module 202. The FPGA 208 may test the IR using the image and determine that the image produces an arbitrary or non-relevant classification. For example, an image that is blurry or of an item such as a ceiling fan, a classroom clock, etc., that is not relevant to generating an education lesson plan, may cause the FPGA 208 to generate a classification that can skew updated parameters to be sent to the first computation module 202. In such examples, the FPGA 208 may identify and/or otherwise flag the image for removal from the database 210 of the first computation module 202. For example, the FPGA 208 may transmit a command, an instruction, etc., to the first computation module 202 to delete the image from the database 210.

In the illustrated example of FIG. 2, the FPGA 208 transmits updated parameters, data management instructions (e.g., instructions to remove data from the database 210), etc., to the network configurator 218 of the computation modules 202, 204, 206 via the network 232. In FIG. 2, the computation modules 202, 204, 206 include the network configurator 218 to map and/or otherwise translate parameters in a first format from the FPGA 208 to parameters in a second format based on a configuration, a type, etc., of the neural networks 212, 214, 216. For example, the FPGA 208 may transmit neural network parameters based on Caffe to the network configurator 218 of the first computation module 202 that is running TensorFlow. In such examples, the network configurator 218 may translate the Caffe neural network parameters to TensorFlow neural network parameters. In other examples, the network configurator 218 may convert a new network topology based on Caffe generated by the FPGA 208 to a new network topology based on TensorFlow of the first neural network 212 by adjusting a number of activation layers, a number of pooling layers, biasing values, etc., of the first neural network 212.

In the illustrated example of FIG. 2, the neural networks 212, 214, 216 include means to configure, modify, and/or otherwise update the neural networks 212, 214, 216 based on parameters received, processed, and mapped by the network configurator 218. For example, the network configurator 218 may transmit the updated parameters to the neural networks 212, 214, 216 and the neural networks 212, 214, 216 may deploy a new instance of the neural networks 212, 214, 216 based on the updated parameters.

In FIG. 2, the neural networks 212, 214, 216 include means to train the neural networks 212, 214, 216 based on data obtained by the collection engine 209. The neural networks 212, 214, 216 include means to improve and/or otherwise optimize the neural networks 212, 214, 216 based on the training. For example, the neural networks 212, 214, 216 may adjust one or more weights, bias values, etc., of the neural networks 212, 214, 216 as increased data are collected by the collection engine 209 and classified by the neural networks 212, 214, 216. In other examples, the neural networks 212, 214, 216 may adjust a quantity of activation layers, a quantity of pooling layers, etc., or any other CNN parameter based on the increased collection of data.

Further shown in the example of FIG. 2, the machine learning system 200 includes an example environment collection engine 234 to collect and/or otherwise obtain data that can be used to train the neural networks 212, 214, 216. In FIG. 2, the environment collection engine 234 is a classroom data collector. In some examples, the environment collection engine 234 is monitoring and obtaining data in the same classroom as the first through third students of FIG. 2. Additionally or alternatively, the environment collection engine 234 may monitor and obtain data in a different classroom. For example, the environment collection engine 234 may correspond to a set of input devices in one or more classrooms, hospital rooms, train stations, etc.

In the illustrated example of FIG. 2, the environment collection engine 234 includes means to obtain data from an input device such as an audio sensor, a microphone, a camera (still or video), and/or a voice recognition system that is monitoring an entire classroom or area. In such examples, the environment collection engine 234 may be obtaining behavioral data associated with the first student, the second student, and the third student. The behavioral data may include how the students interact with each other, how the students as a group react to presented educational materials, etc. In some examples, the environment collection engine 234 obtains data related to the students that the computation modules 202, 204, 206 may not capture (e.g., when the first student walks away from the first computation module 202). Such behavioral data may be used by the FPGA 208 to improve the neural networks 212, 214, 216 by testing the neural networks 212, 214, 216 with data that the neural networks 212, 214, 216 have not yet obtained and/or processed.

The network 232 of the illustrated example of FIG. 2 is the Internet. However, the network 232 may be implemented using any suitable wired and/or wireless network(s) including, for example, one or more data buses, one or more Local Area Networks (LANs), one or more wireless LANs, one or more cellular networks, one or more private networks, one or more public networks, etc. The network 232 enables the computation modules 202, 204, 206 to be in communication with the FPGA 208.

While an example manner of implementing the computation modules 202, 204, 206 is illustrated in FIG. 2, one or more of the elements, processes, and/or devices illustrated in FIG. 2 may be combined, divided, re-arranged, omitted, eliminated, and/or implemented in any other way. Further, the example collection engine 209, the example database 210, the example neural networks 212, 214, 216, the example network configurator 218, and/or, more generally, the example computation modules 202, 204, 206 of FIG. 2 may be implemented by hardware, software, firmware, and/or any combination of hardware, software, and/or firmware.

Thus, for example, any of the example collection engine 209, the example database 210, the example neural networks 212, 214, 216, the example network configurator 218, and/or, more generally, the example computation modules 202, 204, 206 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)), and/or field programmable logic device(s) (FPLD(s)). When reading any of the apparatus or system claims of this patent to cover a purely software and/or firmware implementation, at least one of the example collection engine 209, the example database 210, the example neural networks 212, 214, 216, and/or the example network configurator 218 is/are hereby expressly defined to include a non-transitory computer readable storage device or storage disk such as a memory, a digital versatile disk (DVD), a compact disk (CD), a Blu-ray disk, etc., including the software and/or firmware. Further still, the example computation modules 202, 204, 206 of FIG. 2 may include one or more elements, processes, and/or devices in addition to, or instead of, those illustrated in FIG. 2, and/or may include more than one of any or all of the illustrated elements, processes, and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 3:
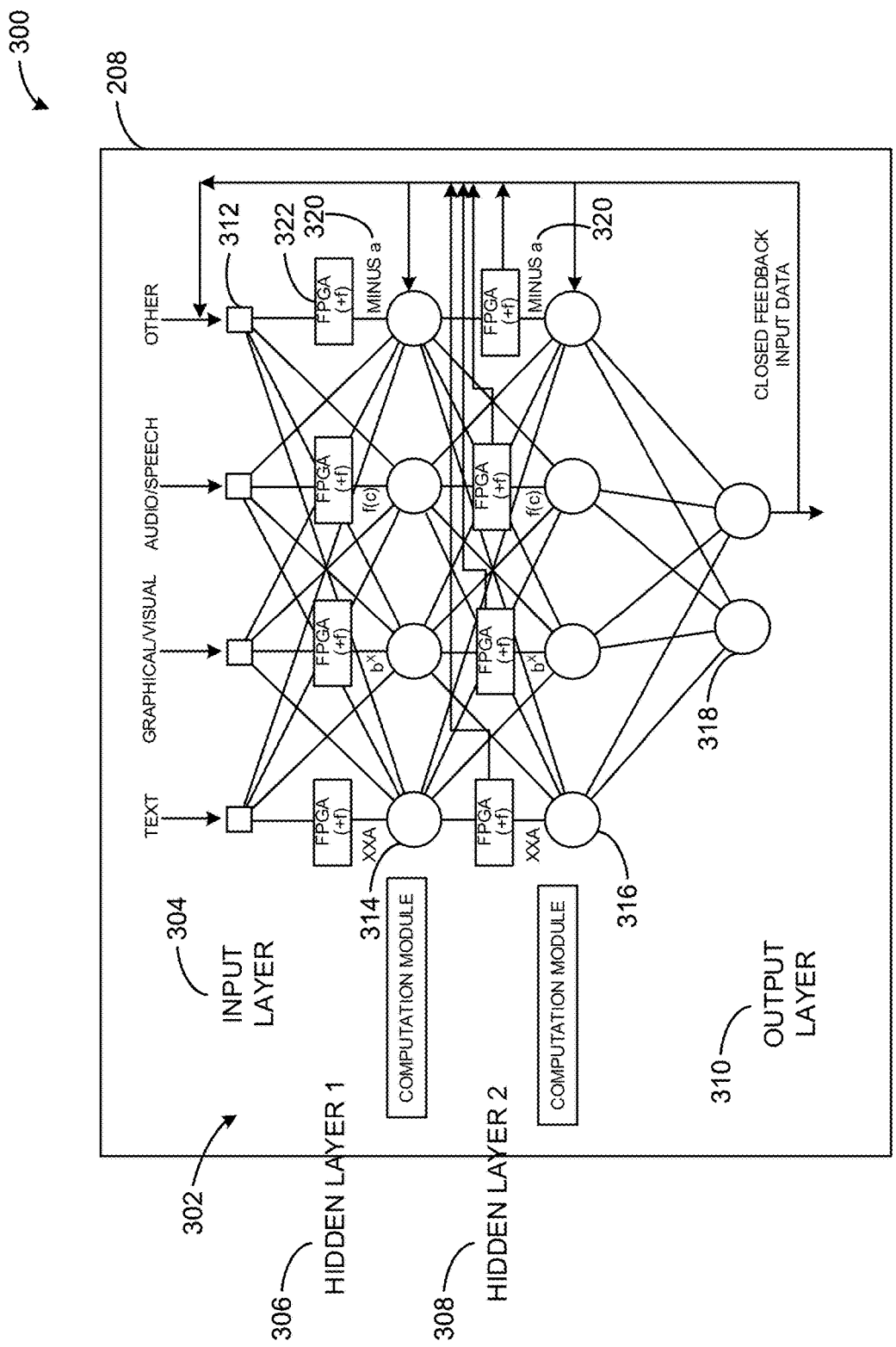
FIG. 3 is a schematic illustration of an example inference design flow corresponding to operation of the example FPGA of FIG. 2.

FIG. 3 is a schematic illustration of an example inference design flow 300 corresponding to operation of the FPGA 208 of FIG. 2. In FIG. 3, the FPGA 208 operates an example FPGA neural network 302 including an example input layer 304, example hidden layers 306, 308, and an example output layer 310. The input layer 304 of the FGPA neural network 302 obtains data from the computation modules 202, 204, 206 of FIG. 2. For example, the input layer 304 may obtain data from the database 210 of the first computation module 202, neural network parameters associated with the first neural network 212, etc. The input layer 304 includes first example artificial neurons 312 that retrieve data such as text-based data, graphical/visual-based data, audio/speech data, etc., to the FPGA neural network 302 for processing.

In the illustrated example of FIG. 3, the FPGA neural network 302 includes a first example hidden layer 306 and a second example hidden layer 308. The first and second hidden layers 306, 308 are disposed between the input layer 304 and the output layer 310. The first hidden layer 306 includes second example artificial neurons 314 and the second hidden layer 308 includes third example artificial neurons 316. In FIG. 3, the FPGA neural network 302 calculates and/or otherwise determines values of the second artificial neurons 314 and the third artificial neurons 316 by multiplying and accumulating neuron values and edge weights from previous layers. For example, the third artificial neurons 316 may obtain a set of weighted inputs associated with the second artificial neurons 314 and calculate example output(s) 318 through example activation function(s) 320.

In the illustrated example of FIG. 3, the FPGA neural network 302 is operative to fine-tune and/or calibrate weighted inputs of the second artificial neurons 314, the third artificial neurons 316, etc., through backpropagation. For example, the FPGA 208 can perform a forward pass through the FPGA neural network 302 by taking a sample at the input layer 304, proceed through the hidden layers 306, 308, and generate a prediction at the output layer 310. When the FPGA 208 is performing an inference function, the FPGA 208 performs the forward pass to obtain the prediction for a given sample input. For accelerated training of the neural networks 212, 214, 216 of FIG. 2, a prediction error from the forward pass is then fed back during a backward pass to update the network weights of the second artificial neurons 314, the third artificial neurons 316, etc.

In FIG. 3, the FPGA 208 accelerates the training of the neural networks 212, 214, 216 by setting the network weights of the second artificial neurons 314 and the third artificial neurons 316 based on the parameters obtained from the computation modules 202, 204, 206. For example, the FPGA 208 may obtain neural network parameters of the first neural network 212 of FIG. 2 including a network topology, network weights, etc. In such examples, the FPGA 208 may adjust the network topology of the FPGA neural network 302 to match and/or otherwise be based on the network topology of the first neural network 212. In other examples, the FPGA 208 may adjust the weights of the second artificial neurons 314 and the third artificial neurons 316 based on the network weights obtained from the first neural network 212. For example, the FPGA 208 may perform such adjustments to the FPGA neural network 302 by inserting example FPGA connections 322 between layers of the FPGA neural network 302. In some examples the FPGA connections 322 may sample outputs of layers and provide intermediary feedback. For example, the FPGA connections 322 disposed between the first hidden layer 306 and the second hidden layer 308 may sample outputs from the first hidden layer 306 and adjust network weights elsewhere in the FPGA neural network 302 based on the sampled outputs.

Figure 4:
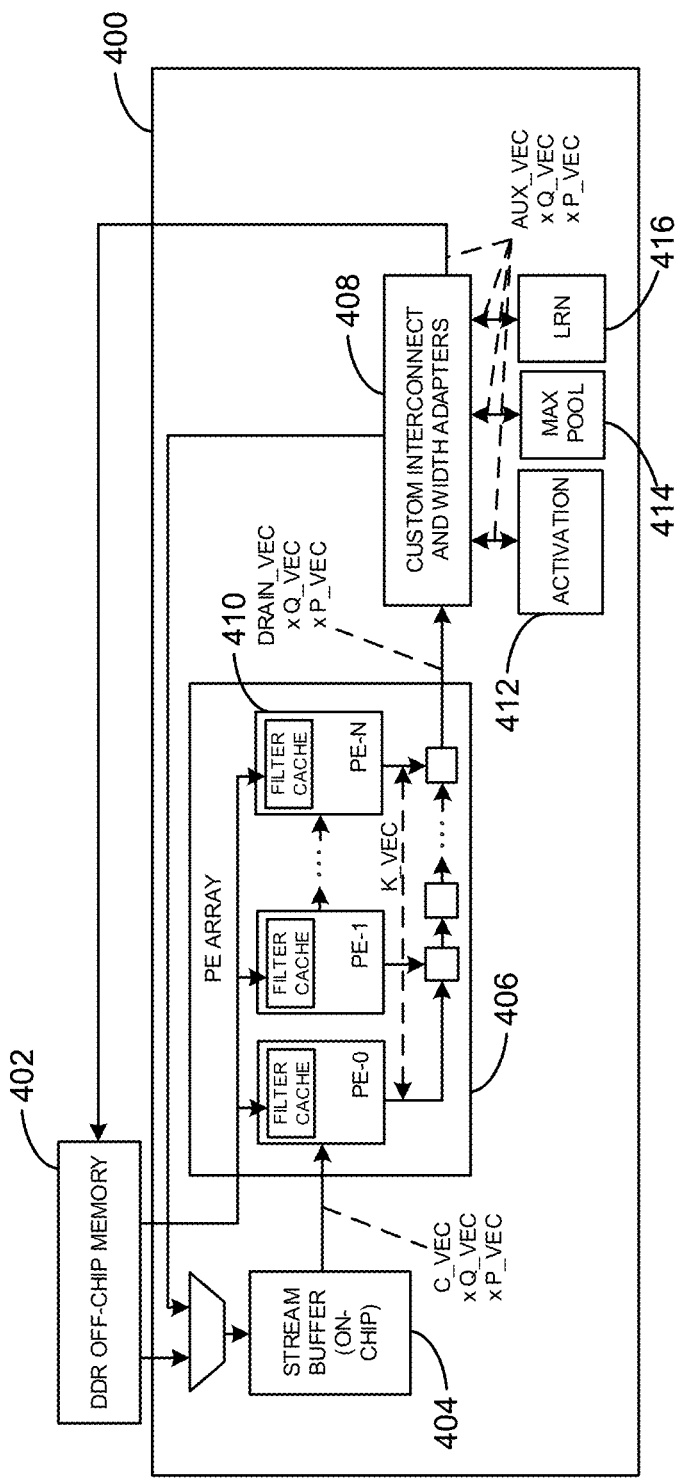
FIG. 4 depicts an example deep learning architecture of the example FPGA of FIG. 2.

FIG. 4 depicts an example deep learning architecture (DLA) 400 of the FPGA 208 of FIG. 2. The DLA 400 corresponds to a block diagram of hardware and/or software used to implement the FPGA 208 of FIG. 2. The DLA 400 of FIG. 4 obtains data from example memory 402. In FIG. 4, the memory 402 is DDR off-chip memory. Alternatively, the memory 402 may be included in the DLA 400. In FIG. 4, the DLA includes an example stream buffer 404, an example processing element (PE) array 406, and an example interconnect and width adapters 408. The stream buffer 404 retrieves and/or otherwise obtains data to process from the memory 402. In FIG. 4, the stream buffer 404 is on-chip (e.g., included in the FPGA 208).

In the illustrated example of FIG. 4, the PE array 406 includes example PE elements 410 to process incoming data. For example, each of the PE elements 410 may include an accumulator, a multiplier, a comparator, etc., and/or a combination thereof. For example, the PE array 406 may perform convolution operations on input images using Red-Green-Blue pixel values associated with the input images. The interconnect and width adapters 408 of FIG. 4 facilitate communication between the PE array 406 and example convolution functions 412, 414, 416 including an example activation convolution function 412, an example max pool convolution function 414, and an example local response normalization (LRN) convolution function 416.

In FIG. 4, the interconnect and width adapters 408 can configure the PE array 406 based on a convolution function to be performed. For example, the interconnect and width adapters 408 may obtain parameters associated with the activation convolution function 412 and transmit the parameters to the PE array 406 via the stream buffer 404. In such examples, the interconnect and width adapters 408 may configure one or more of the PE elements 410 based on the parameters. In other examples, the interconnect and width adapters 408 may configure one or more of the PE elements 410 based on parameters associated with the max pool convolution function 414, the LRN convolution function 416, etc. In FIG. 4, the interconnect and width adapters 408 is operative to transmit data (e.g., output data, convolution outputs, PE array outputs, etc.) to the memory 402.

Figure 5:
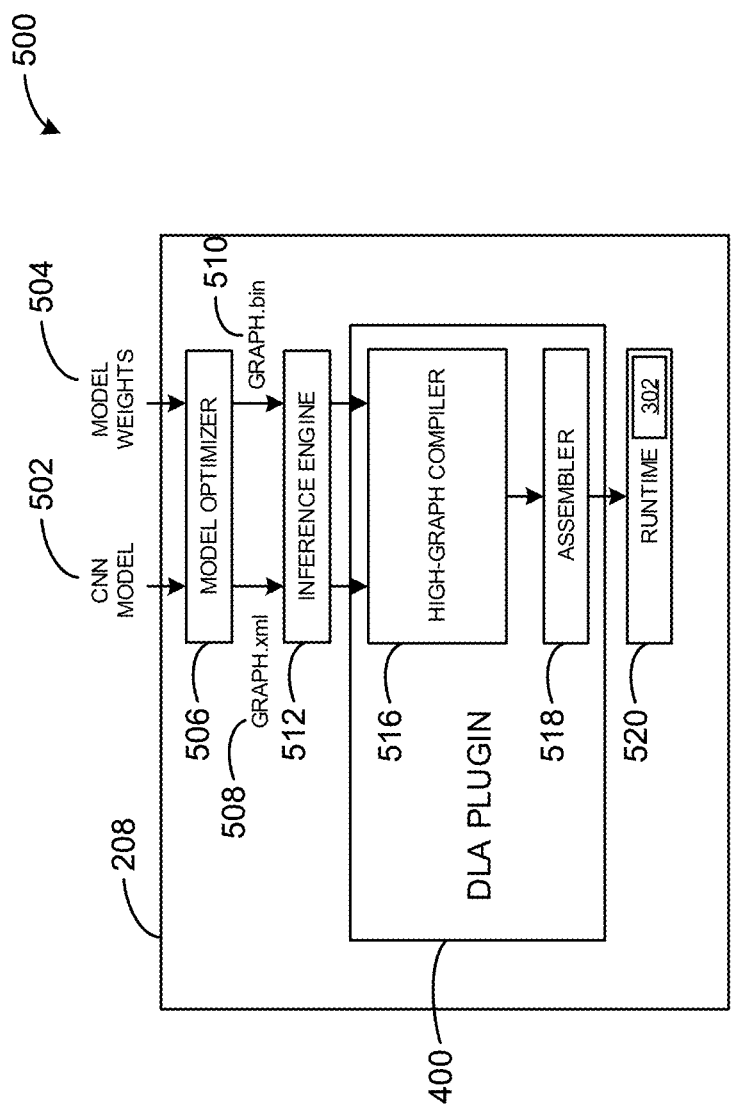
FIG. 5 is a block diagram of an example implementation of the example FPGA of FIG. 2.

FIG. 5 is a block diagram of an example implementation of the FPGA 208 of FIG. 2. In FIG. 5, the FPGA 208 obtains information from the computation modules 202, 204, 206 of FIG. 2. In FIG. 5, the FPGA 208 can obtain information including an example CNN model 502 corresponding to one of the neural networks 212, 214, 216. In FIG. 5, the FPGA 208 can obtain information including neural network parameters such as example model weights (e.g., network weights, neuron weights, etc.) 504 corresponding to the CNN model 502. For example, the CNN model 502 may correspond to a network topology and the model weights 504 may correspond to weights assigned to artificial neurons included in the network topology.

In the illustrated example of FIG. 5, the FPGA 208 includes an example model optimizer 506 to generate a first example IR 508 and a second example IR 510. For example, the model optimizer 506 may perform static, compilation-time analysis of the CNN model 502, the model weights 504, etc., to optimize execution on the FPGA 208. In FIG. 5, the model optimizer 506 generates the first IR 508 based on the CNN model 502. In FIG. 5, the first IR 508 is an XML file (Graph.xml), which corresponds to a representation of the network topology of the CNN model 502. In FIG. 5, the model optimizer 506 generates the second IR 510 based on the model weights 504. In FIG. 5, the second IR 510 is a bin file (Graph.bin), which corresponds to a representation of the model weights 504.

In some examples, the model optimizer 506 performs horizontal and vertical layer fusion and redundant network branch pruning on the CNN model 502, the model weights 504, etc., to generate the first and second IR 508, 510. For example, the model optimizer 506 may determine that one or more layers, connections, etc., of the CNN model 502 are not used and can be removed by the model optimizer 506. In the illustrated example of FIG. 5, the model optimizer 506 feeds the reduced, quantized network corresponding to the first and second IR 508, 510 to an example inference engine 512. The inference engine 512 of FIG. 5 applies logical rules to a knowledge base and deduces new knowledge or inferences. For example, the inference engine 512 may apply logical rules to data obtained from the computation modules 202, 204, 206 to generate new classifications, outputs, etc. In such examples, additional rules in the inference engine 512 can be triggered as additional data is obtained from the computation modules 202, 204, 206. In some examples, the inference engine 512 can adjust the first and second IR 508, 510 prior to being compiled by the DLA 400 of FIG. 4.

In the illustrated example of FIG. 5, the DLA 400 of FIG. 4 includes an example high-graph compiler 516 and an example assembler 518. In FIG. 5, the high-graph compiler 516 is operative to compile a high-level computation graph into an IR corresponding to optimized hardware architecture, machine code, etc. For example, the high-graph compiler 516 may compile and/or otherwise translate the first and second IR 508, 510 into a third IR corresponding to a configuration of the FPGA 208. In other examples, the high-graph compiler 516 may compile and/or otherwise translate the first and second IR 508, 510 into a fourth IR corresponding to machine readable instructions.

In FIG. 5, the high-graph compiler 516 can generate an IR corresponding to the hardware architecture, the machine code, etc., by performing graph analysis and/or transformation passes. For example, the high-graph compiler 516 may perform graph analysis including at least one of addressing, slice analysis, or slice offsets on the first and second IR 508, 510. For example, the high-graph compiler 516 may generate addresses for artificial neurons included in the CNN model 502. In other examples, the high-graph compiler 516 may determine slices or biases included in the first and second IR 508, 510.

In some examples, the high-graph compiler 516 can generate the third IR, the fourth IR, etc., by performing transformation passes. For example, the high-graph compiler 516 may perform Eltwise passes, Eltwise convolution merging passes, slice passes, destride passes, etc. In other examples, the high-graph compiler 516 may perform global average pool passes, pool concatenation passes, constant propagation, fusion passes, identity insertion passes, etc.

In the illustrated example of FIG. 5, the high-graph compiler 516 transmits output(s) (e.g., the third IR, the fourth IR, etc.) to the assembler 518. In FIG. 5, the DLA 400 includes the assembler 518 to generate a hardware configuration, machine readable instructions, etc., based on the third and fourth IR. For example, the assembler 518 may convert the third IR into a hardware configuration of the FPGA 208. For example, the FPGA 208 may program itself based on the hardware configuration based on the third IR. In such examples, the FPGA 208 may process data from the computation modules 202, 204, 206 at runtime 520 using the hardware configuration. In other examples, the assembler 518 may convert the fourth IR into computer readable instructions. For example, the assembler 518 may convert the fourth IR binary code.

In operation, the FPGA 208 obtains information from one or more of the computation modules 202, 204, 206 to generate a FPGA neural network that can be executed at runtime 520. For example, the FPGA neural network may correspond to the FPGA neural network 302 of FIG. 3. For example, the FPGA 208 may execute the FPGA neural network 302 that corresponds to the first neural network 212 of FIG. 2. In such examples, the FPGA 208 may obtain data from the database 210 of the first computation module 202, process the data with the FPGA neural network 302, and generate outputs based on the processing. The FPGA neural network 302 may generate classifications, identify the data, etc. The FPGA neural network 302 may compare the classifications, the identifications, etc., to the classifications, the identifications, etc., generated by the first neural network 212. In such examples, the FGPA neural network 302 executing at runtime 520 may determine whether the first neural network 212 can be adjusted. The FPGA neural network 302 that is operative on the FPGA 208 may generate and transmit a network topology, neural network parameter(s), etc., to the network configurator 218 of the first computation module 202 in response to the determination.

Figure 6:
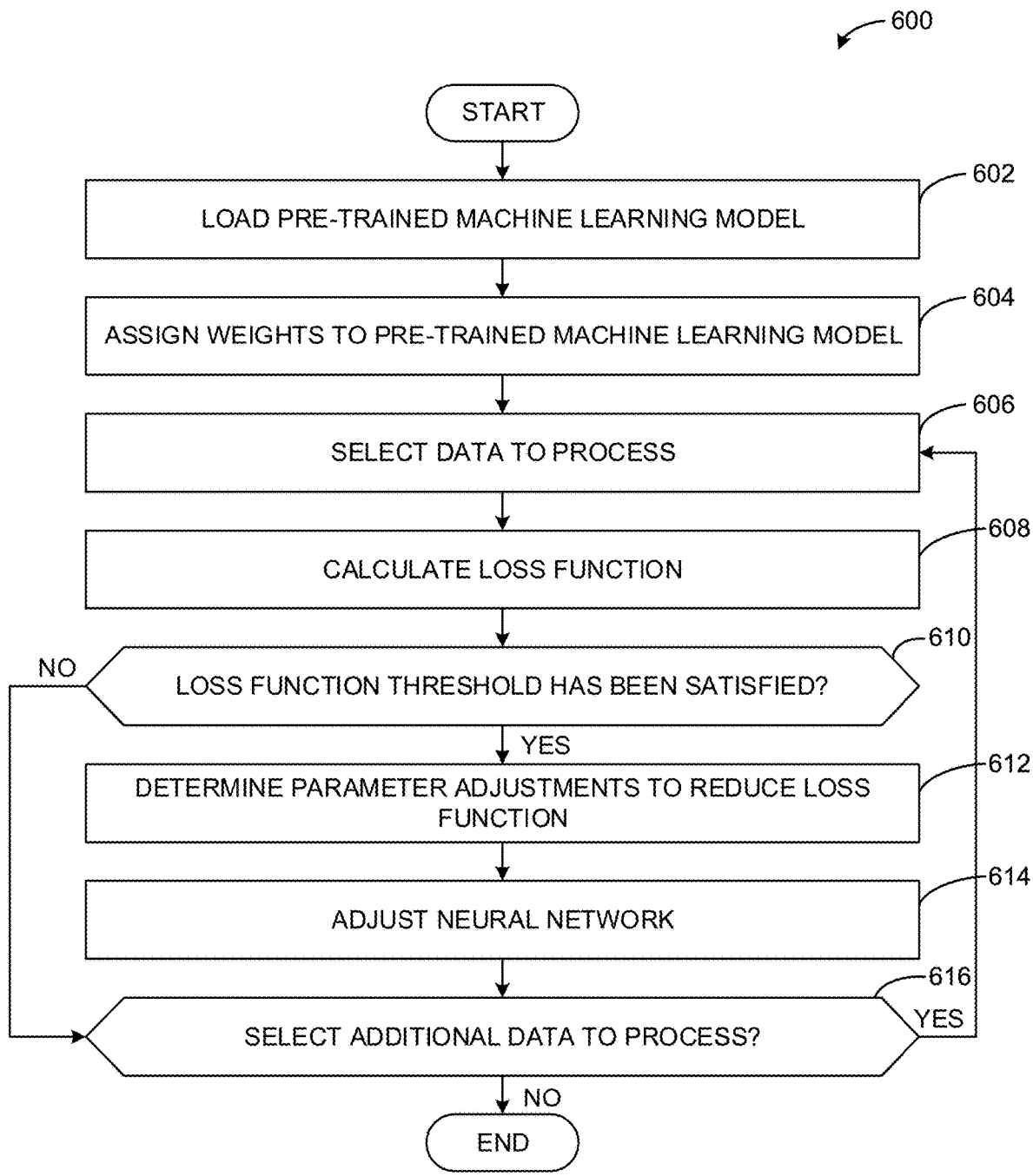
FIG. 6 is a flowchart representative of machine readable instructions which may be executed to implement one or more of the example computation modules of FIG. 2 to train one or more example neural networks.
Figure 7:
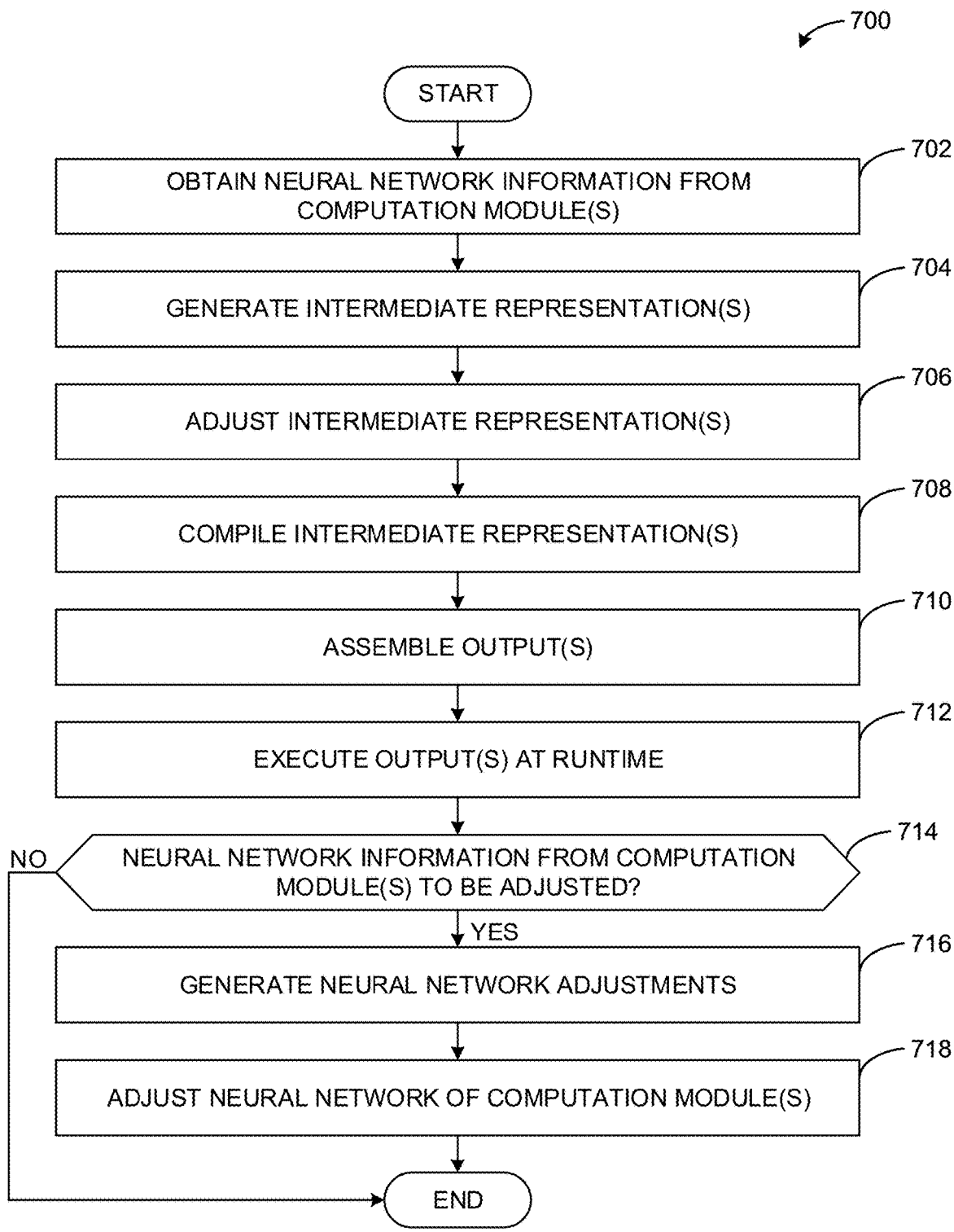
FIG. 7 is a flowchart representative of machine readable instructions which may be executed to implement the example FPGA of FIGS. 2, 4, and/or 5 to accelerate the training of one or more example neural networks.

Flowcharts representative of example hardware logic, machine readable instructions, hardware implemented state machines, and/or any combination thereof for implementing the computation modules 202, 204, 206 of FIG. 2 and/or the FPGA 208 of FIGS. 2, 3, and/or 5 is shown in FIGS. 6-7. The machine readable instructions may be an executable program or portion of an executable program for execution by a computer processor such as the processor 812 shown in the example processor platform 800 discussed below in connection with FIG. 8. The program may be embodied in software stored on a non-transitory computer readable storage medium such as a CD-ROM, a floppy disk, a hard drive, a DVD, a Blu-ray disk, or a memory associated with the processor 812, but the entire program and/or parts thereof could alternatively be executed by a device other than the processor 812 and/or embodied in firmware or dedicated hardware. Further, although the example program is described with reference to the flowcharts illustrated in FIGS. 6-7, many other methods of implementing the example computation modules 202, 204, 206 and/or the FPGA 208 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

As mentioned above, the example processes of FIGS. 6-7 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory, and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

FIG. 6 is a flowchart representative of example machine readable instructions 600 which may be executed to implement one or more of the computation modules 202, 204, 206 of FIG. 2 to train one or more of the neural networks 212, 214, 216 of FIG. 2. The machine readable instructions 600 of FIG. 6 begin at block 602, at which the computation modules 202, 204, 206 load a pre-trained machine learning model. For example, the first computation module 202 may configure the first neural network 212 based on a pre-trained machine learning model included in the first improvement strategies 220.

At block 604, the computation modules 202, 204, 206 assign weights to the pre-trained machine learning model. For example, the first neural network 212 may assign artificial neuron weights, bias values, etc., to the first neural network 212. In some examples, the artificial neuron weights, bias values, etc., are randomly generated. In other examples, the artificial neuron weights, bias values, etc., are assigned using default values included in the database 210 of the first computation module 202.

At block 606, the computation modules 202, 204, 206 select data to process. For example, the first neural network 212 may obtain text data from the database 210. In such examples, the text data may be handwritten data, mark-up notes on education materials, etc., generated by the first student. For example, the text data may be a handwriting sample validated and/or otherwise classified by a teacher.

At block 608, the computation modules 202, 204, 206 calculate a loss function. For example, the first neural network 212 may calculate a loss function that is used to measure an inconsistency, a difference, etc., between a predicted value of the first neural network 212 and an actual value assigned to the text data by the teacher.

At block 610, the computation modules 202, 204, 206 determine whether a loss function threshold has been satisfied. For example, the first neural network 212 may compare a first value of the difference between the predicted value and the actual value to a second value of the loss function threshold and determine whether the first value satisfies the loss function threshold. In such examples, the first value may satisfy the loss function threshold by being greater than the second value. For example, the first value may correspond that the predicted value is too inaccurate when compared to the actual value. In such examples, the first value may be greater than the second value, where an increase in the first value may correspond to a decrease in accuracy of the first neural network 212.

If, at block 610, the computation modules 202, 204, 206 determine that the loss function threshold has not been satisfied, control proceeds to block 616 to determine whether to select additional data to process. If, at block 610, the computation modules 202, 204, 206 determine that the loss function threshold has been satisfied, then, at block 612, the computation modules 202, 204, 206 determine parameter adjustments to reduce the loss function. For example, the first neural network 212 may generate an updated network topology, artificial neuron weights, bias values, etc., to reduce the loss function.

At block 614, the computation modules 202, 204, 206 adjust the neural network. For example, the first neural network 212 may train and/or otherwise update the first neural network 212 using the parameters determined at block 612.

At block 616, the computation modules 202, 204, 206 determine whether to select additional data to process. For example, the first neural network 212 may select another instance of text-based data from the database 210. In other examples, the first neural network 212 may determine not to select additional data as the loss function has been determined to have been optimized and/or otherwise cannot be reduced further.

If, at block 616, the computation modules 202, 204, 206 determine to select additional data to process, control returns to block 606 to select additional data to process, otherwise the machine readable instructions 600 of FIG. 6 conclude.

FIG. 7 is a flowchart representative of example machine readable instructions 700 which may be executed to implement the FPGA 208 of FIG. 2 to accelerate the training of one or more of the neural networks 212, 214, 216 of FIG. 2. The machine readable instructions 700 of FIG. 7 begin at block 702, at which the FPGA 208 obtains neural network information from computation module(s). For example, the model optimizer 506 of FIG. 5 may obtain the CNN model 502 and the model weights 504 of FIG. 5. In such examples, the CNN model 502 and the model weights 504 may correspond to the first neural network 212 of FIG. 2.

At block 704, the FPGA 208 generates intermediate representation(s). For example, the model optimizer 506 may generate the first IR 508 based on the CNN model 502 and the second IR 510 based on the model weights 504.

At block 706, the FPGA 208 adjusts the intermediate representation(s). For example, the inference engine 512 of FIG. 5 may adjust the first IR 508 and/or the second IR 510.

At block 708, the FPGA 208 compiles the intermediate representation(s). For example, the high-graph compiler 516 of FIG. 5 may compile the first IR 508 and the second IR 510 into a third IR. In such examples, the third IR may correspond to a hardware configuration of the FPGA 208, machine readable instructions, etc.

At block 710, the FPGA 208 assembles output(s). For example, the assembler 518 of FIG. 5 may generate a hardware configuration of the FPGA 208, readable instructions, etc., based on the third IR generated by the high-graph compiler 516.

At block 712, the FPGA 208 executes output(s) at runtime. For example, the FPGA 208 may re-program itself based on the hardware configuration generated by the assembler 518. In such examples, the FPGA 208 may execute the FPGA neural network 302 using the hardware configuration. The FPGA neural network 302 may process data obtained from the first computation module 202 at runtime 520 of FIG. 5.

At block 714, the FPGA 208 determines whether neural network information from the computation module(s) is to be adjusted. For example, the FPGA neural network 302 executing at runtime 520 may generate a classification of data obtained from the first computation module 202. In such example, the FPGA neural network 302 may compare the classification of the data to a classification determined by the first neural network 212. The FPGA neural network 302 may determine that the first neural network 212 is to be updated based on the comparison.

If, at block 714, the FPGA 208 determines that neural network information from the computation module(s) is not to be adjusted, the machine readable instructions 700 of FIG. 7 conclude. If, at block 714, the FPGA 208 determines that neural network information from the computation module(s) is to be adjusted, then, at block 716, the FPGA 208 generates neural network adjustments. For example, the FPGA 208 may generate an updated network topology, artificial neuron weights, bias values, a quantity of activation layers, etc., associated with the first neural network 212.

At block 718, the FPGA 208 adjusts the neural network of the computation module(s). For example, the FPGA 208 may transmit the neural network adjustments to the network configurator 218 of the first computation module 202. When the network configurator 218 receives the adjustments, the network configurator 218 may adjust the first neural network 212 based on the adjustments. In response to the adjustment, the first neural network 212 may process data from the database 210 of the first computation module 202 using the adjustments generated by the FPGA 208. In response to adjusting the neural network of the computation module(s), the machine readable instructions 700 of FIG. 7 conclude.

Figure 8:
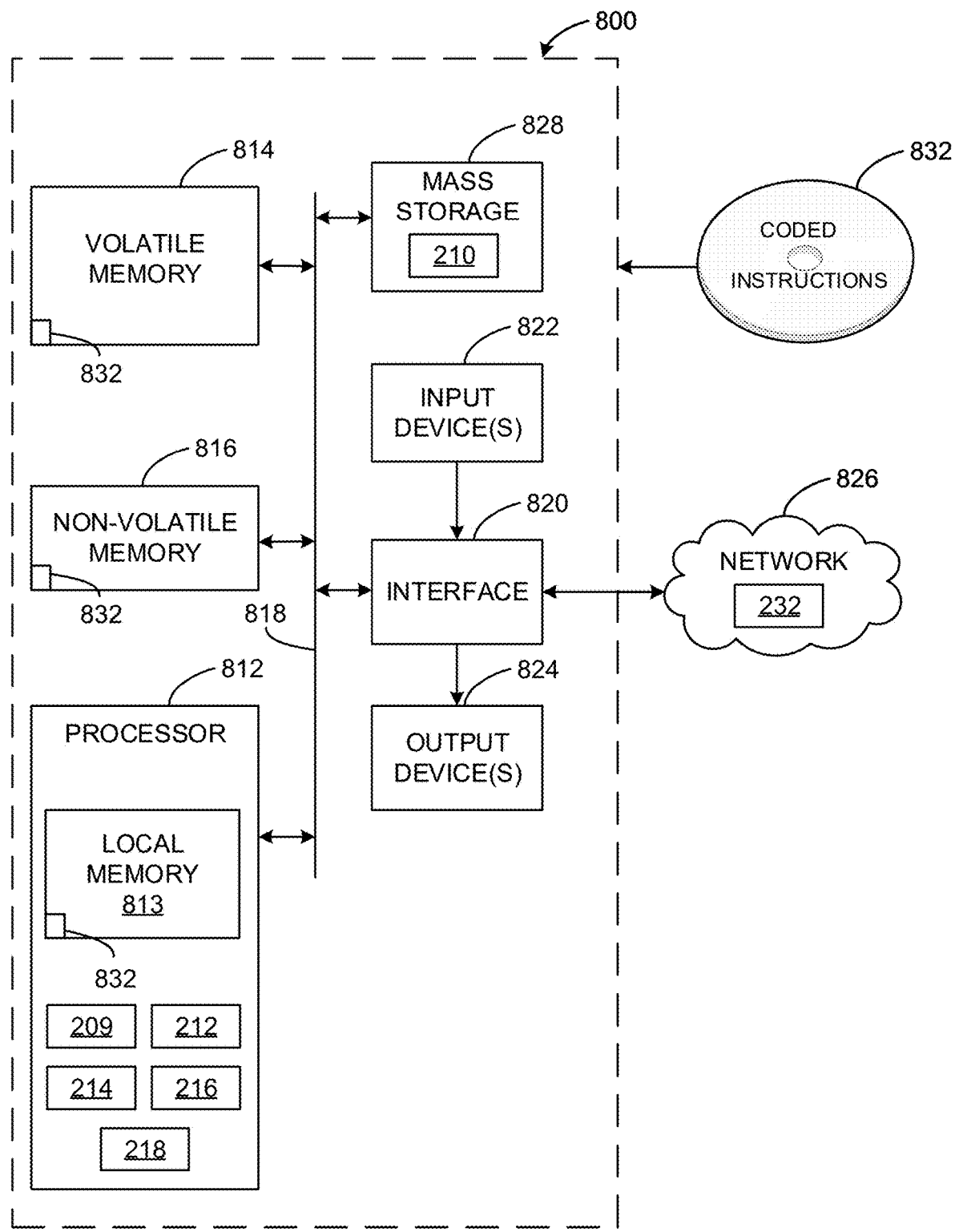
FIG. 8 is a block diagram of an example processing platform structured to execute the instructions of FIG. 6 to implement the example computation modules of FIG. 2.

FIG. 8 is a block diagram of an example processor platform 800 structured to execute the instructions of FIG. 6 to implement one of the computation modules 202, 204, 206 of FIG. 2. The processor platform 800 can be, for example, a personal computer, a workstation, a self-learning machine (e.g., a neural network), a mobile device (e.g., a cell phone, a smart phone, a tablet such as an iPad™), a personal digital assistant (PDA), a personal video recorder, a headset or other wearable device, or any other type of computing device.

The processor platform 800 of the illustrated example includes a processor 812. The processor 812 of the illustrated example is hardware. For example, the processor 812 can be implemented by one or more integrated circuits, logic circuits, microprocessors, GPUs, DSPs, or controllers from any desired family or manufacturer. The hardware processor may be a semiconductor based (e.g., silicon based) device. In this example, the processor 812 implements the collection engine 209, the neural networks 212, 214, 216, and the network configurator 218.

The processor 812 of the illustrated example includes a local memory 813 (e.g., a cache). The processor 812 of the illustrated example is in communication with a main memory including a volatile memory 814 and a non-volatile memory 816 via a bus 818. The volatile memory 814 may be implemented by Synchronous Dynamic Random Access Memory (SDRAM), Dynamic Random Access Memory (DRAM), RAMBUS® Dynamic Random Access Memory (RDRAM®), and/or any other type of random access memory device. The non-volatile memory 816 may be implemented by flash memory and/or any other desired type of memory device. Access to the main memory 814, 816 is controlled by a memory controller.

The processor platform 800 of the illustrated example also includes an interface circuit 820. The interface circuit 820 may be implemented by any type of interface standard, such as an Ethernet interface, a universal serial bus (USB), a Bluetooth® interface, a near field communication (NFC) interface, and/or a PCI express interface.

In the illustrated example, one or more input devices 822 are connected to the interface circuit 820. The input device(s) 822 permit(s) a user to enter data and/or commands into the processor 812. The input device(s) 822 can be implemented by, for example, an audio sensor, a microphone, a camera (still or video), a keyboard, a button, a mouse, a touchscreen, a track-pad, a trackball, an isopoint device, and/or a voice recognition system.

One or more output devices 824 are also connected to the interface circuit 820 of the illustrated example. The output devices 824 can be implemented, for example, by display devices (e.g., a light emitting diode (LED), an organic light emitting diode (OLED), a liquid crystal display (LCD), a cathode ray tube display (CRT), an in-place switching (IPS)

display, a touchscreen, etc.), a tactile output device, a printer, and/or speaker. The interface circuit 820 of the illustrated example, thus, typically includes a graphics driver card, a graphics driver chip, and/or a graphics driver processor.

The interface circuit 820 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 826. The communication can be via, for example, an Ethernet connection, a digital subscriber line (DSL) connection, a telephone line connection, a coaxial cable system, a satellite system, a line-of-site wireless system, a cellular telephone system, etc. In this example, the network 826 implements the network 232 of FIG. 2.

The processor platform 800 of the illustrated example also includes one or more mass storage devices 828 for storing software and/or data. Examples of such mass storage devices 828 include floppy disk drives, hard drive disks, compact disk drives, Blu-ray disk drives, redundant array of independent disks (RAID) systems, and digital versatile disk (DVD) drives. In this example, the mass storage devices 828 implement the database 210 of FIG. 2.

The machine executable instructions 832 of FIG. 6 may be stored in the mass storage device 828, in the volatile memory 814, in the non-volatile memory 816, and/or on a removable non-transitory computer readable storage medium such as a CD or DVD.

Figure 9:
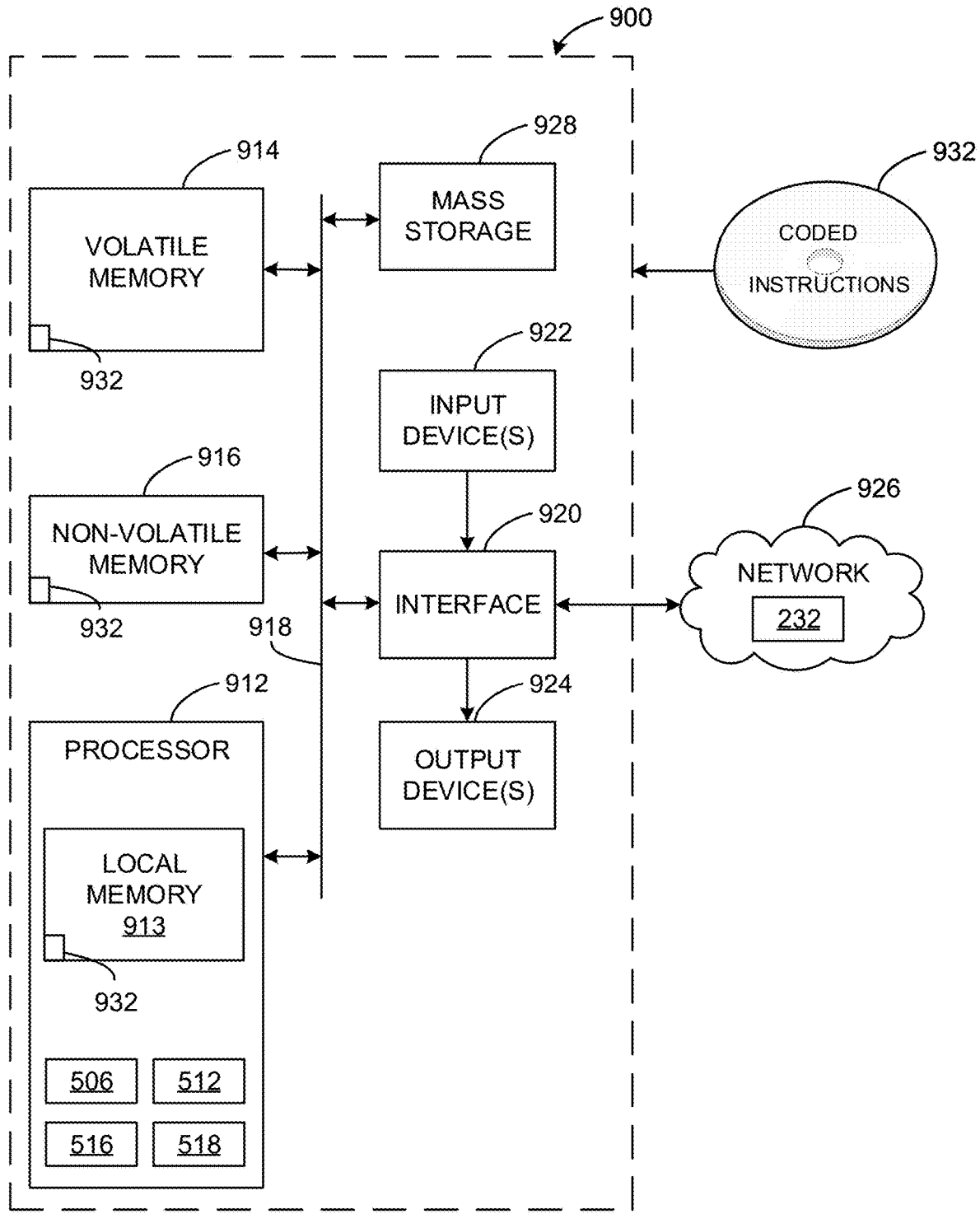
FIG. 9 is a block diagram of an example processing platform structured to execute the instructions of FIG. 7 to implement the example FPGA of FIGS. 2, 4, and/or 5.

FIG. 9 is a block diagram of an example processor platform 900 structured to execute the instructions of FIG. 7 to implement the FPGA 208 of FIGS. 2, 3, and/or 5. The processor platform 900 can be, for example, a server, a personal computer, a workstation, a self-learning machine (e.g., a neural network), or any other type of computing device.

The processor platform 900 of the illustrated example includes a processor 912. The processor 912 of the illustrated example is hardware. For example, the processor 912 can be implemented by one or more integrated circuits, logic circuits, microprocessors, GPUs, DSPs, or controllers from any desired family or manufacturer. The hardware processor may be a semiconductor based (e.g., silicon based) device. In this example, the processor 912 implements the model optimizer 506, the inference engine 512, the high-graph compiler 516, and the assembler 518 of FIG. 5.

The processor 912 of the illustrated example includes a local memory 913 (e.g., a cache). The processor 912 of the illustrated example is in communication with a main memory including a volatile memory 914 and a non-volatile memory 916 via a bus 918. The volatile memory 914 may be implemented by Synchronous Dynamic Random Access Memory (SDRAM), Dynamic Random Access Memory (DRAM), RAMBUS® Dynamic Random Access Memory (RDRAM®), and/or any other type of random access memory device. The non-volatile memory 916 may be implemented by flash memory and/or any other desired type of memory device. Access to the main memory 914, 916 is controlled by a memory controller.

The processor platform 900 of the illustrated example also includes an interface circuit 920. The interface circuit 920 may be implemented by any type of interface standard, such as an Ethernet interface, a universal serial bus (USB), a Bluetooth® interface, a near field communication (NFC) interface, and/or a PCI express interface.

In the illustrated example, one or more input devices 922 are connected to the interface circuit 920. The input device(s) 922 permit(s) a user to enter data and/or commands into the processor 912. The input device(s) 922 can be implemented by, for example, an audio sensor, a microphone, a camera (still or video), a keyboard, a button, a mouse, a touchscreen, a track-pad, a trackball, an isopoint device, and/or a voice recognition system.

One or more output devices 924 are also connected to the interface circuit 920 of the illustrated example. The output devices 924 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer, and/or speaker. The interface circuit 920 of the illustrated example, thus, typically includes a graphics driver card, a graphics driver chip, and/or a graphics driver processor.

The interface circuit 920 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 926. The communication can be via, for example, an Ethernet connection, a digital subscriber line (DSL) connection, a telephone line connection, a coaxial cable system, a satellite system, a line-of-site wireless system, a cellular telephone system, etc.

The processor platform 900 of the illustrated example also includes one or more mass storage devices 928 for storing software and/or data. Examples of such mass storage devices 928 include floppy disk drives, hard drive disks, compact disk drives, Blu-ray disk drives, redundant array of independent disks (RAID) systems, and digital versatile disk (DVD) drives.

The machine executable instructions 932 of FIG. 7 may be stored in the mass storage device 928, in the volatile memory 914, in the non-volatile memory 916, and/or on a removable non-transitory computer readable storage medium such as a CD or DVD.

From the foregoing, it will be appreciated that example systems, methods, apparatus, and articles of manufacture have been disclosed that improve data training of a machine learning model using an FPGA. Examples disclosed herein include a plurality of computation modules associated with corresponding users. The plurality of computation modules is operative to collect various data formats tailored to users of the computation modules. One or more of the computation modules transmit neural network parameters to a FPGA to accelerate training the neural networks of the one or more computation modules. The FPGA can re-program itself based on the neural network parameters, execute a FPGA neural network based on the re-programming, and can generate updated parameters that can be used to improve operation of the neural networks of the one or more computation modules. The disclosed systems, methods, apparatus, and articles of manufacture improve the efficiency of using a computing device by off-loading data training tasks to a dedicated FPGA to re-allocated previously used computing resources to other tasks of the computing device. The disclosed methods, apparatus and articles of manufacture are accordingly directed to one or more improvement(s) in the functioning of a computer.

The following pertain to further examples disclosed herein.

Example 1 includes a system to improve data training of a neural network, the system comprising one or more computation modules, each of the one or more computation modules associated with a corresponding user, the one or more computation modules training first neural networks using data associated with the corresponding users, and a field-programmable gate array (FPGA) to obtain a first set of parameters from each of the one or more computation modules, the first set of parameters associated with the first neural networks, configure a second neural network based on the first set of parameters, execute the second neural network to generate a second set of parameters, and transmit the second set of parameters to the first neural networks to update the first neural networks.

Example 2 includes the system of example 1, wherein each of the one or more computation modules is a headset, a mobile device, or a wearable device.

Example 3 includes the system of example 1, wherein the data is audio data, visual data, or text data.

Example 4 includes the system of example 1, wherein at least one of the first set of parameters or the second set of parameters includes at least one of an artificial neuron weight, a bias value, a network topology, a quantity of activation layers, or a quantity of pooling layers.

Example 5 includes the system of example 1, wherein each of the one or more computation modules includes a collection engine to obtain the data, a database to store the data, and a network configurator to train the first neural networks using the second set of parameters.

Example 6 includes the system of example 1, wherein the FPGA includes a model optimizer to generate a first intermediate representation based on one of the first neural networks, an inference engine to adjust the intermediate representation, a high-graph compiler to generate a second intermediate representation, and an assembler to generate an output based on the second intermediate representation, the output to be executed at runtime.

Example 7 includes the system of example 6, wherein the output is a hardware configuration of the FPGA or machine readable instructions.

Example 8 includes a non-transitory computer readable storage medium comprising instructions which, when executed, cause a machine to at least train first neural networks using one or more computation modules, each of the one or more computation modules associated with a corresponding user, the one or more computation modules to train the first neural networks using data associated with the corresponding users, obtain, with a field-programmable gate array (FPGA), a first set of parameters from each of the one or more computation modules, the first set of parameters associated with the first neural networks, configure, with the FPGA, a second neural network based on the first set of parameters, execute, with the FPGA, the second neural network to generate a second set of parameters, and transmit, with the FPGA, the second set of parameters to the first neural networks to update the first neural networks.

Example 9 includes the non-transitory computer readable storage medium of example 8, wherein each of the one or more computation modules is a headset, a mobile device, or a wearable device.

Example 10 includes the non-transitory computer readable storage medium of example 8, wherein the data is audio data, visual data, or text data.

Example 11 includes the non-transitory computer readable storage medium of example 8, wherein at least one of the first set of parameters or the second set of parameters includes at least one of an artificial neuron weight, a bias value, a network topology, a quantity of activation layers, or a quantity of pooling layers.

Example 12 includes the non-transitory computer readable storage medium of example 8, wherein each of the one or more computation modules includes a collection engine to obtain the data, a database to store the data, and a network configurator to train the first neural networks using the second set of parameters.

Example 13 includes the non-transitory computer readable storage medium of example 8, wherein the FPGA includes a model optimizer to generate a first intermediate representation based on one of the first neural networks, an inference engine to adjust the intermediate representation, a high-graph compiler to generate a second intermediate representation, and an assembler to generate an output based on the second intermediate representation, the output to be executed at runtime.

Example 14 includes the non-transitory computer readable storage medium of example 13, wherein the output is a hardware configuration of the FPGA or machine readable instructions.

Example 15 includes a system to improve data training of a neural network, the system comprising means to train first neural networks, each of the means associated with a corresponding user, the means to train the first neural networks is to use data associated with the corresponding users, means to obtain a first set of parameters associated with the first neural networks, means to configure a second neural network based on the first set of parameters, means to execute the second neural network to generate a second set of parameters, and means to transmit the second set of parameters to the first neural networks to update the first neural networks.

Example 16 includes the system of example 15, wherein the means to train the first neural networks include a headset, a mobile device, or a wearable device.

Example 17 includes the system of example 15, wherein the data is audio data, visual data, or text data.

Example 18 includes the system of example 15, wherein at least one of the first set of parameters or the second set of parameters includes at least one of an artificial neuron weight, a bias value, a network topology, a quantity of activation layers, or a quantity of pooling layers.

Example 19 includes the system of example 15, wherein the means to train the first neural networks includes means to obtain the data, means to store the data, and means to train the first neural networks using the second set of parameters.

Example 20 includes the system of example 15, further including means to generate a first intermediate representation based on one of the first neural networks, means to adjust the intermediate representation, means to generate a second intermediate representation, and means to generate an output based on the second intermediate representation, the output to be executed at runtime.

Although certain example systems, methods, apparatus, and articles of manufacture have been disclosed herein, the scope of coverage of this patent is not limited thereto. On the contrary, this patent covers all systems, methods, apparatus, and articles of manufacture fairly falling within the scope of the claims of this patent.

What is claimed is:

1. A system to improve data training of a neural network, the system comprising:
   one or more processors, the one or more processors respectively associated with one or more corresponding users, the one or more processors to train first neural networks based on data associated with the corresponding users; and a field-programmable gate array (FPGA) to:
configure a second neural network based on a first set of parameters from the one or more processors, the first set of parameters associated with the first neural networks;
execute the second neural network to determine a difference between a first output associated with a first one of the first neural networks and a second output of the second neural network;
generate a second set of parameters associated with the first one of the first neural networks after a determination to update the first one of the first neural networks based on the difference between the first output and the second output; and
cause transmission of the second set of parameters to at least the first one of the first neural networks to cause an update to at least the first one of the first neural networks.

2. The system of claim 1, wherein a first one of the one or more processors is associated with a headset, a mobile device, or a wearable device.

3. The system of claim 1, wherein the data is audio data, visual data, or text data.

4. The system of claim 1, wherein at least one of the first set of parameters or the second set of parameters includes at least one of an artificial neuron weight, a bias value, a network topology, a quantity of activation layers, or a quantity of pooling layers.

5. The system of claim 1, wherein a first one of the one or more processors includes storage to store the data, the first one of the processors to execute:
collection engine software to obtain the data; and
network configuration software to train at least some of the first neural networks based on the second set of parameters.

6. The system of claim 1, wherein the FPGA is to implement:
model optimizer circuitry to generate a first intermediate representation based on the first one of the first neural networks;
inference engine circuitry to cause an adjustment of the first intermediate representation after a test of the first intermediate representation, the test based on the data;
high-graph compiler circuitry to generate a second intermediate representation based on the adjustment; and
assembler circuitry to generate an executable file based on the second intermediate representation, the executable file to be executed at runtime.

7. The system of claim 6, wherein the executable file is a hardware configuration of the FPGA or machine readable instructions.

8. A non-transitory computer readable storage medium comprising instructions to configure a field-programmable gate array (FPGA) based on a first set of parameters associated with first neural networks to at least:
execute a second neural network based on the first set of parameters, the second neural network to determine a difference between a first output associated with a first one of the first neural networks and a second output of the second neural network;
generate a second set of parameters for the first one of the first neural networks after a determination to update the first one of the first neural networks, the determination based on the difference between the first output and the second output; and cause transmission of the second set of parameters to at least the first one of the first neural networks to cause an update to at least the first one of the first neural networks.

9. The non-transitory computer readable storage medium of claim 8, wherein respective ones of the first neural networks are associated with at least one of a headset, a mobile device, or a wearable device.

10. The non-transitory computer readable storage medium of claim 8, wherein the instructions configure the FPGA to execute the second neural network based on at least one of audio data, visual data, or text data.

11. The non-transitory computer readable storage medium of claim 8, wherein at least one of the first set of parameters or the second set of parameters includes at least one of an artificial neuron weight, a bias value, a network topology, a quantity of activation layers, or a quantity of pooling layers.

12. The non-transitory computer readable storage medium of claim 9, wherein the at least one of the headset, the mobile device, or the wearable device includes processor circuitry to execute:
collection engine software to obtain at least one of audio data, visual data, or text data from one or more of the first neural networks; and
network configuration software to train at least some of the first neural networks based on the second set of parameters.

13. The non-transitory computer readable storage medium of claim 8, wherein the instructions configure the FPGA to implement:
model optimizer circuitry to generate a first intermediate representation based on the first one of the first neural networks;
inference engine circuitry to cause a change of the first intermediate representation after a test of the first intermediate representation;
high-graph compiler circuitry to generate a second intermediate representation based on the change; and
assembler circuitry to generate an executable file based on the second intermediate representation, the executable file to be executed at runtime.

14. The non-transitory computer readable storage medium of claim 13, wherein the executable file is a hardware configuration of the FPGA or machine readable instructions.

15. A system to improve data training of a neural network, the system comprising:
means for training first neural networks, the first neural networks respectively associated with one or more corresponding users, the means for training to train the first neural networks based on data associated with the corresponding users; and
means for executing operations to:
configure a second neural network based on a first set of parameters associated with the first neural networks;
execute the second neural network to determine a difference between a first output associated with a first one of the first neural networks and a second output of the second neural network;
generate a second set of parameters corresponding to the first one of the first neural networks after a determination to update the first one of the first neural networks has been made based on the difference between the first output and the second output; and cause transmission of the second set of parameters to at least the first one of the first neural networks to cause an update to at least the first one of the first neural networks.

16. The system of claim 15, wherein the means for training is associated with a headset, a mobile device, or a wearable device.

17. The system of claim 15, wherein the data is audio data, visual data, or text data.

18. The system of claim 15, wherein at least one of the first set of parameters or the second set of parameters includes at least one of an artificial neuron weight, a bias value, a network topology, a quantity of activation layers, or a quantity of pooling layers.

19. The system of claim 15, wherein the means for training is to retrain one or more of the first neural networks based on the second set of parameters.

20. The system of claim 15, wherein the means for executing is to:
generate a first intermediate representation based on the first one of the first neural networks;
adjust the first intermediate representation after a test of the first intermediate representation, the test based on the data;
generate a second intermediate representation based on the adjustment; and
compile an executable file based on the second intermediate representation, the executable file to be executed at runtime.

21. A system to improve data training of a neural network, the system comprising:
first instructions;
processor circuitry to execute the first instructions to train first neural networks based on data associated with corresponding users;
second instructions; and
a field-programmable gate array (FPGA) to be programmed by the second instructions to:
configure a second neural network based on a first set of parameters from the processor circuitry, the first set of parameters associated with the first neural networks;
execute the second neural network to determine a difference between a first output associated with a first one of the first neural networks and a second output of the second neural network;
after a determination to update the first one of the first neural networks based on the difference between the first output and the second output, generate a second set of parameters associated with the first one of the first neural networks; and
cause transmission of the second set of parameters to the first one of the first neural networks to cause an update to the first one of the first neural networks.

22. The system of claim 21, wherein the first instructions include:
collection engine software to obtain the data; and
network configuration software to train at least some of the first neural networks based on the second set of parameters.

23. The system of claim 21, wherein the data is first data and the second instructions cause the FPGA to instantiate:
model optimizer circuitry to generate a first intermediate representation based on the first one of the first neural networks;
inference engine circuitry to cause an adjustment of the first intermediate representation after a test of the first intermediate representation, the test based on second data obtained by the processor circuitry;
high-graph compiler circuitry to generate a second intermediate representation based on the adjustment; and
assembler circuitry to generate an executable file based on the second intermediate representation, the executable file to be executed at runtime.

* * * * *